US009128650B2

(12) United States Patent
Mori

(10) Patent No.: US 9,128,650 B2
(45) Date of Patent: Sep. 8, 2015

(54) DATA PROCESSING APPARATUS, INFORMATION PROCESSING SYSTEM, CONTROL METHOD FOR THE SAME, AND STORAGE MEDIUM STORING A PROGRAM

(71) Applicant: CANON KABUSHIKI KAISHA, Tokyo (JP)

(72) Inventor: Ryuta Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 398 days.

(21) Appl. No.: 13/633,944

(22) Filed: Oct. 3, 2012

(65) Prior Publication Data

US 2013/0097297 A1 Apr. 18, 2013

(30) Foreign Application Priority Data

Oct. 18, 2011 (JP) ................................ 2011-229177

(51) Int. Cl.
*G06F 3/12* (2006.01)
*H04L 29/08* (2006.01)
*G06F 9/445* (2006.01)

(52) U.S. Cl.
CPC ............ *G06F 3/1237* (2013.01); *G06F 3/1273* (2013.01); *H04L 67/2852* (2013.01); *H04L 67/34* (2013.01); *G06F 9/44505* (2013.01)

(58) Field of Classification Search
CPC . G06F 3/1237; G06F 3/1273; G06F 9/44505; H04L 67/2852; H04L 67/34
See application file for complete search history.

(56) References Cited

U.S. PATENT DOCUMENTS

| | | | | |
|---|---|---|---|---|
| 6,339,783 | B1 * | 1/2002 | Horikiri | 709/203 |
| 8,595,727 | B2 * | 11/2013 | Nakahara | 718/100 |
| 2004/0172487 | A1 * | 9/2004 | Arpirez et al. | 710/8 |
| 2006/0056859 | A1 * | 3/2006 | Otani | 399/16 |
| 2006/0250645 | A1 * | 11/2006 | Miyazaki | 358/1.15 |
| 2008/0288609 | A1 * | 11/2008 | Pramberger | 709/217 |
| 2009/0216869 | A1 * | 8/2009 | Kennedy | 709/223 |
| 2010/0178067 | A1 * | 7/2010 | Azami et al. | 399/16 |

FOREIGN PATENT DOCUMENTS

| | | |
|---|---|---|
| JP | 2009-187098 A | 8/2009 |

* cited by examiner

*Primary Examiner* — Michael C Lai
(74) *Attorney, Agent, or Firm* — Carter, DeLuca, Farrell & Schmidt, LLP

(57) ABSTRACT

A job execution instruction is received from an information processing apparatus, an environment variable instructed in the job execution instruction is acquired, and an environment variable management table is searched for an environment variable definition that corresponds to the acquired environment variable. An apparatus that is in the network and holds a value that is to replace the environment variable is selected based on an environment variable definition that was searched, the value that is to replace the environment variable is acquired from the selected apparatus, and the environment variable is replaced with the value.

11 Claims, 7 Drawing Sheets

F I G. 1
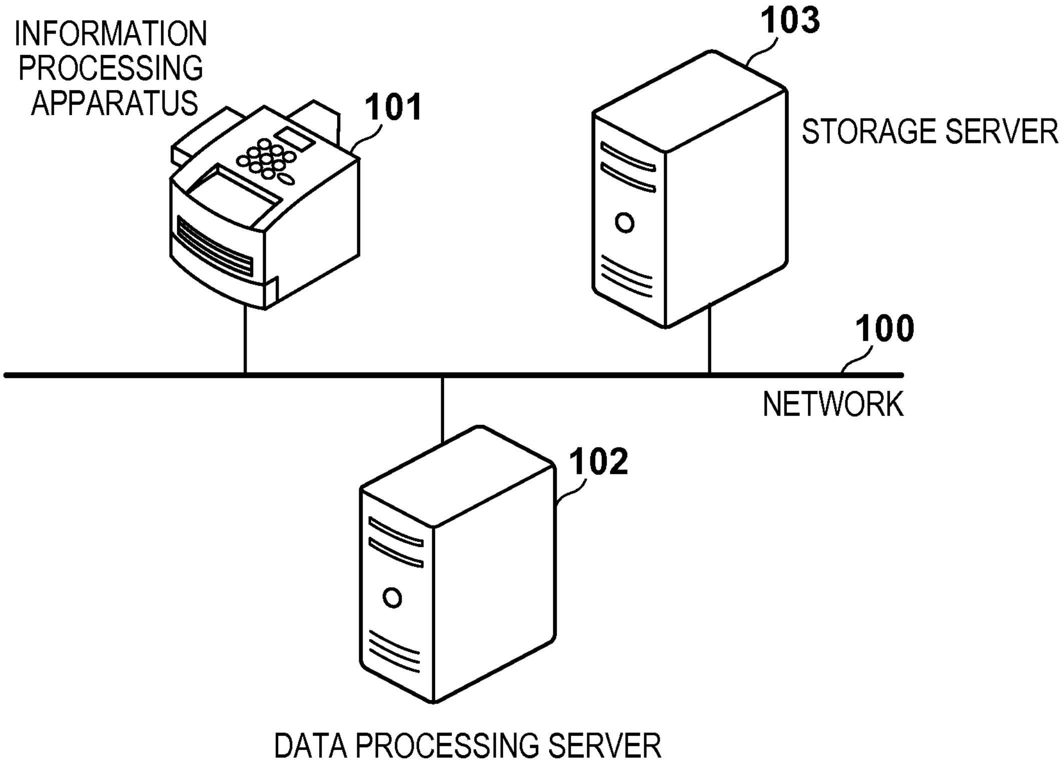

F I G. 5
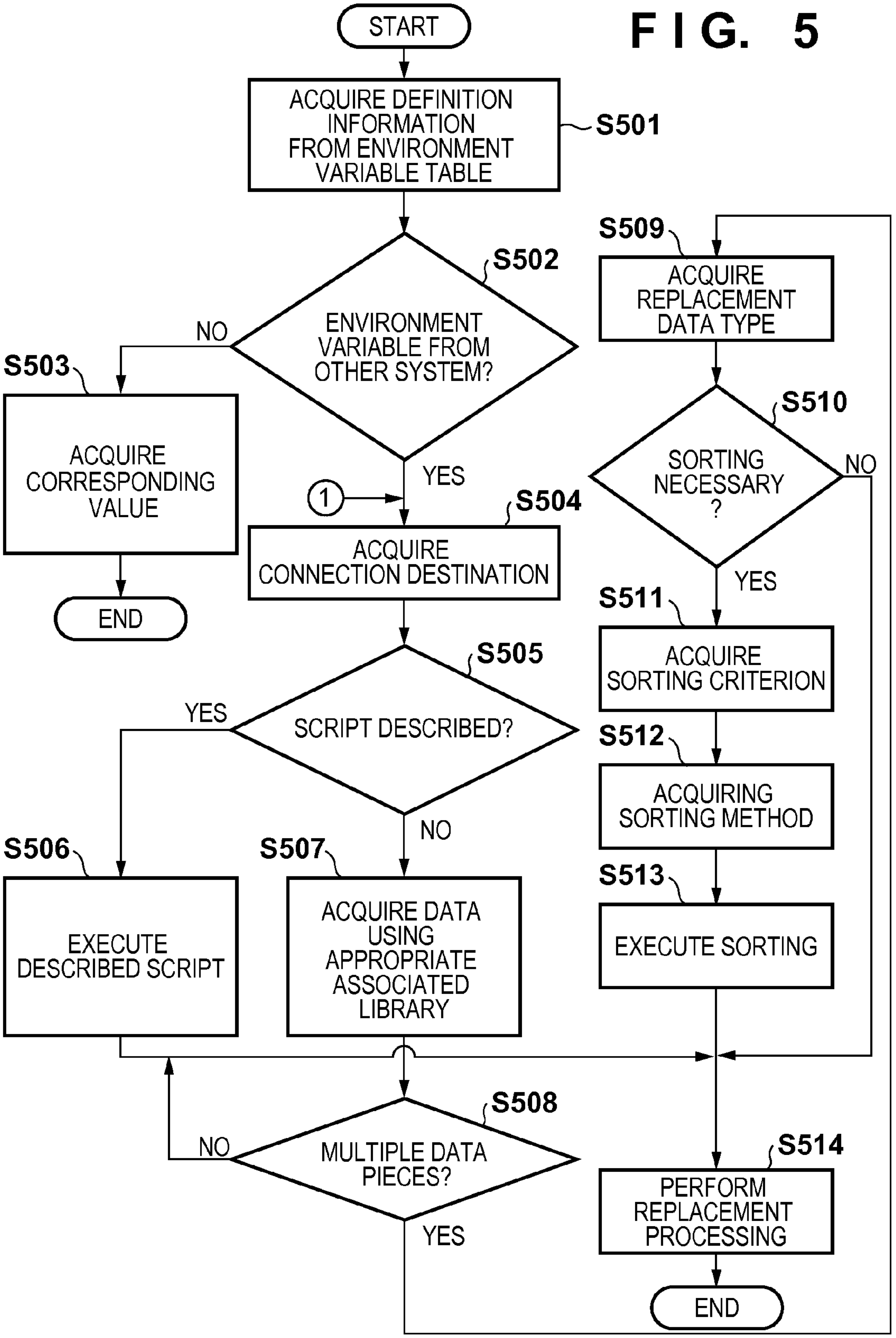

FIG. 6

| ENVIRONMENT VARIABLE (600) | CONNECTION DESTINATION (601) | PATH (602) | REPLACEMENT DATA TYPE (604) | SORTING METHOD (605) | SORTING CRITERION (606) |
|---|---|---|---|---|---|
| %1 : FOLDER% | A | http://... | SINGULAR | DESCENDING ORDER | DATE |
| %1 : HOME% | B | http://... | SINGULAR | DESCENDING ORDER | DATE |
| %0 : TEMP% | C | http://... | SINGULAR | DESCENDING ORDER | DATE |

| ENVIRONMENT VARIABLE | CONNECTION DESTINATION | PATH | REPLACEMENT DATA TYPE | SORTING METHOD | SORTING CRITERION |
|---|---|---|---|---|---|
| %2 : SID% | MFP | http://... | SINGULAR | DESCENDING ORDER | DATE |

```
<ScanTicket>
 <Header>
  <ticketName>Sample</ticketName>
  <ticketID>02932141</ticketID>
  <ticketOwner>Suzuki</ticketOwner>
  <Role>Admin</Role>
  ..............
 </Header>
  <ScanSetting>
   <Resolution>600</Resolution>
  <FileType>PDF</FileType>
  ..............
  </ScanSetting>
  <ImageProcesserSetting>
    <imageEnginName>Defult</imageEnginName>
  ..............
  </ImageProcesserSetting>
  <CloudSetting>
    <CloudName>XXXStrage</CloudName>
    <CloudUserID>suzuki.ichiro</CloudUserID>
    <Uploadto>/image/%1:FOLDER%</Uploadto>
  ..............
  </CloudSetting>
</ScanTicket>
```

901

DATA PROCESSING APPARATUS, INFORMATION PROCESSING SYSTEM, CONTROL METHOD FOR THE SAME, AND STORAGE MEDIUM STORING A PROGRAM

BACKGROUND OF THE INVENTION

1. Field of the Invention

The present invention relates to a data processing apparatus, an information system having a data processing server and a storage server, a control method for the same, and a storage medium storing a program.

2. Description of the Related Art

In recent years, various application programs have been run on information processing apparatuses such as PCs. Information processing apparatuses have a mechanism called an "environment variable" that can define a value that is used by multiple applications in common in order to be able to effectively configure settings for the applications. With this mechanism, first a variable and a value for replacement if that variable is designated are registered in a PC. Next, the variable is designated at the place where the variable is to be used in applications (e.g., a settings file). According to this mechanism, the PC can detect the variable designated by the applications at the time of execution, and replace that variable with the designated variable.

Accordingly, by defining a value to be used as an environment variable in application programs, the applications do not need to individually hold the value. This enables realizing a reduction in maintenance, cost, and the like for changing values.

A system such as the following is a specific example that employs this technology. The system includes an information processing apparatus, a data processing server, and a storage server, and first an instruction regarding a job in the data processing server is selected from the information processing apparatus and executed. Scanned data is then registered in the storage server by the information processing apparatus based on the instruction. For example, in the case of a folder that is created once each date in the storage server, by defining a date environment variable in the instruction, that environment variable is replaced with current date data at the time of execution, and data can be registered in the corresponding date folder in the storage server. In this way, an environment variable can also designate a combination of a variable and a fixed value, or a variable and a value that can be acquired from a PC.

Recently, among multi function processing apparatuses (MFPs) that include a scanner and a printer, there are MFPs that include environment variables such as those described above. Several environment variables can be defined in the MFP and used in applications that run on the MFP. For example, according to Japanese Patent Laid-open No. 2009-187098, an environment variable is defined in an MFP, a settings file is provided for each user who is logged in to the MFP, and processing for using the settings files to replace the defined variables with values is performed.

With the above-described system, there are issues such as the following when using an environment variable with the method of Japanese Patent Laid-open No. 2009-187098. One specific case is the case where a data processing server and a storage server are installed separately in Japanese and America. If an environment variable for acquiring date information is registered and used in the data processing server in Japan, there will be a time difference with the storage server in America. For this reason, it is not possible for acquired date information to be used in the registration of data in a date folder in the storage server in America. The reason for this is that when it is April 18 in Japan time, it is April 17 in America due to the time difference, and with a system in which date folders are created automatically, the folder for April 18 will not have been created yet in America, and it is naturally impossible for data to be saved in that folder.

In other words, when an environment variable is registered using the above-described technology of Japanese Patent Laid-open No. 2009-187098, only a fixed variable that a user has arbitrarily designated or a system-specific value (e.g., date information that can be acquired from a PC) can be registered. For this reason, it is not possible to dynamically acquire a value from the resource of another system and use it according to the purpose of the use of the environment variable.

SUMMARY OF THE INVENTION

An aspect of the present invention is to eliminate the above-mentioned problems with the conventional technology.

The present invention provides a mechanism that enables not only a fixed value to be used as the value of an environment variable, but also a value that is dynamically acquired from another device.

The present invention in its first aspect provides an information processing system in which at least an information processing apparatus, a data processing server, and a storage server are connected via a network, the information processing system comprising: an acquisition unit configured to, based on a job execution instruction from the information processing apparatus, acquire an environment variable that is instructed in the job execution instruction; a search unit configured to search, in an environment variable management table, for an environment variable definition that corresponds to the environment variable acquired by the acquisition unit; a selection unit configured to, based on an environment variable definition searched by the search unit, select an apparatus that is in the network and holds a value that is to replace the environment variable; and a replacement unit configured to acquire the value that is to replace the environment variable from the apparatus selected by the selection unit, and replace the environment variable with the value.

The present invention in its second aspect provides a data processing apparatus connected to a network, comprising: an acquisition unit configured to, based on a job execution instruction from a device that is connected to the network, acquire an environment variable that is instructed in the job execution instruction; a search unit configured to search, in an environment variable management table, for an environment variable definition that corresponds to the environment variable acquired by the acquisition unit; a selection unit configured to, based on an environment variable definition searched by the search unit, select a device that is in the network and holds a value that is to replace the environment variable; and a replacement unit configured to acquire the value that is to replace the environment variable from the device selected by the selection unit, and replace the environment variable with the value.

The present invention in its third aspect provides a control method for controlling an information processing system in which at least an information processing apparatus, a data processing server, and a storage server are connected via a network, the control method comprising: an acquisition step of the data processing server acquiring, based on a job execution instruction from the information processing apparatus, an environment variable that is instructed in the job execution instruction; a search step of the data processing server searching, in an environment variable management table, for an environment variable definition that corresponds to the environment variable acquired in the acquisition step; a selection step of the data processing server selecting, based on an environment variable definition searched in the search step, an apparatus that is in the network and holds a value that is to replace the environment variable; and a replacement step of the data processing server acquiring the value that is to replace the environment variable from the apparatus selected in the selection step, and replacing the environment variable with the value.

The present invention in its fourth aspect provides a control method for controlling a data processing apparatus connected to a network, comprising: an acquisition step of acquiring, based on a job execution instruction from a device that is connected to the network, an environment variable that is instructed in the job execution instruction; a search step of searching, in an environment variable management table, for an environment variable definition that corresponds to the environment variable acquired in the acquisition step; a selection step of selecting, based on an environment variable definition searched in the search step, a device that is in the network and holds a value that is to replace the environment variable; and a replacement step of acquiring the value that is to replace the environment variable from the device selected in the selection step, and replacing the environment variable with the value.

The present invention in its fifth aspect provides a computer-readable storage medium storing a program for controlling a data processing apparatus connected to a network, the program causing a computer to execute: an acquisition step of acquiring, based on a job execution instruction from a device that is connected to the network, an environment variable that is instructed in the job execution instruction; a search step of searching, in an environment variable management table, for an environment variable definition that corresponds to the environment variable acquired in the acquisition step; a selection step of selecting, based on an environment variable definition searched in the search step, a device that is in the network and holds a value that is to replace the environment variable; and a replacement step of acquiring the value that is to replace the environment variable from the device selected in the selection step, and replacing the environment variable with the value.

The present invention enables the value of an environment variable to be dynamically acquired from another device and used.

Further features of the present invention will become apparent from the following description of exemplary embodiments with reference to the attached drawings.

BRIEF DESCRIPTION OF THE DRAWINGS

FIG. 1 is a diagram showing an example of the configuration of a network system that includes an information processing apparatus according to embodiments.

FIG. 5 is a flowchart illustrating replacement processing performed by the data processing server according to an embodiment.

FIG. 6 is a diagram illustrating an example of an environment variable management table that is used when replacing an environment variable according to an embodiment.

FIG. 8 is a diagram illustrating an example of an environment variable management table that is used when replacing an environment variable according to an embodiment.

FIG. 9 is a diagram showing an example of a job instruction according to the embodiments.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Like constituent elements will be given like reference signs, and redundant descriptions thereof will not be given.

First Embodiment

FIG. 1 is a diagram showing an example of the configuration of an information processing system that includes an information processing apparatus according to embodiments of the present invention.

This information processing system includes an information processing apparatus 101, a data processing server 102, and a storage server 103 that are connected via a network 100. Note that the number of these devices is of course not limited to that shown in FIG. 1. The network 100 is for performing communication between these apparatuses, and may be an intranet, the Internet, or another network system. The information processing apparatus 101 may be a multi function processing apparatus (MFP), for example. The data processing server 102 has functions for processing a job in accordance with a request from the information processing apparatus 101 and registering data in the storage server 103. The storage server 103 saves data in accordance with a request from the data processing server 102, and returns requested resource information to the data processing server 102. Note that the data processing server 102 and the storage server 103 may be configured by a data processing apparatus such as a PC.

Figure 2:
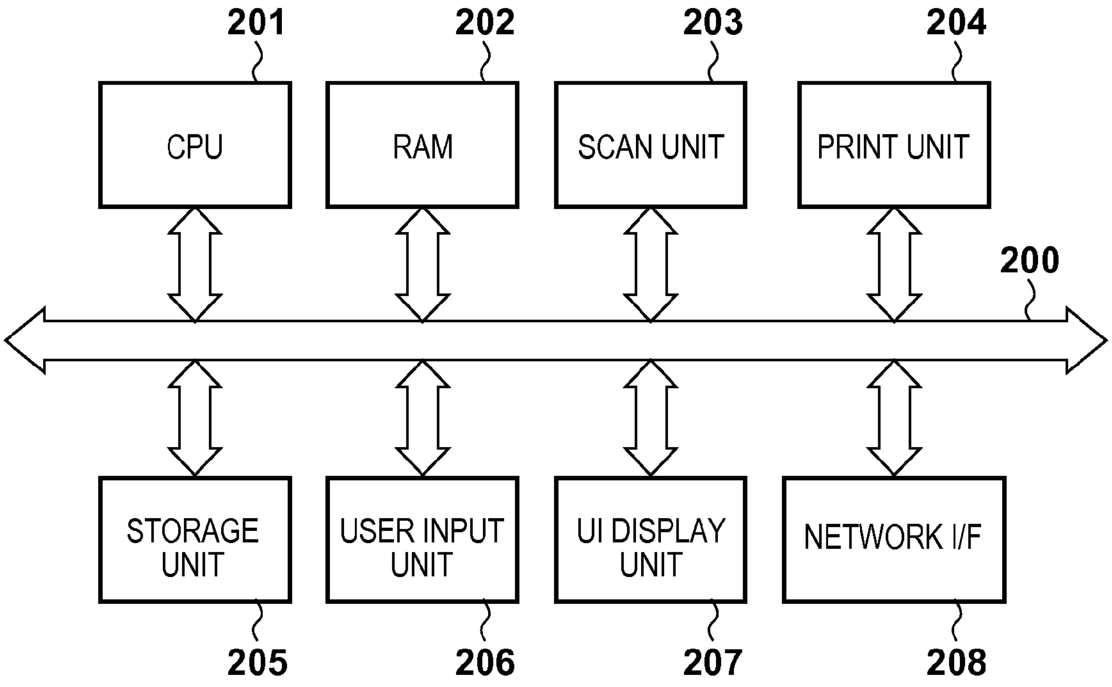
FIG. 2 is a block diagram illustrating an example of the configuration of the information processing apparatus according to the embodiments.

FIG. 2 is a block diagram illustrating an example of the configuration of the information processing apparatus 101 according to the embodiments. The case of an MFP is shown here.

A CPU 201 performs overall control of the information processing apparatus 101 in accordance with programs that have been read out from a storage unit 205 and deployed to a RAM 202. The RAM 202 provides an area for the deployment of programs to be executed by the CPU 201, and a work area for the CPU 201. A scan unit 203 can obtain image data of an original by optically reading the original. A print unit 204 prints an image based on image data obtained by the scan unit 203 reading an original, or image data that was received via the network 100. The storage unit 205 stores programs and various settings, and may be an HDD, an NVRAM, or the like. A user input unit 206 is used by a user to input commands and data. A UI display unit 207 displays messages and various types of data to the user. Note that the user input unit 206 and the UI display unit 207 may be configured by a touch panel or the like. A network interface (I/F) 208 performs communication with other devices via the network 100. The above units are connected to the CPU 201 via a main bus 200.

Note that in the information processing apparatus 101 of the embodiments, the CPU 201 executes later-described processing by controlling the RAM 202, the scan unit 203, the print unit 204, the storage unit 205, the user input unit 206, the UI display unit 207, and the network interface 208 via the main bus 200.

Figure 3:
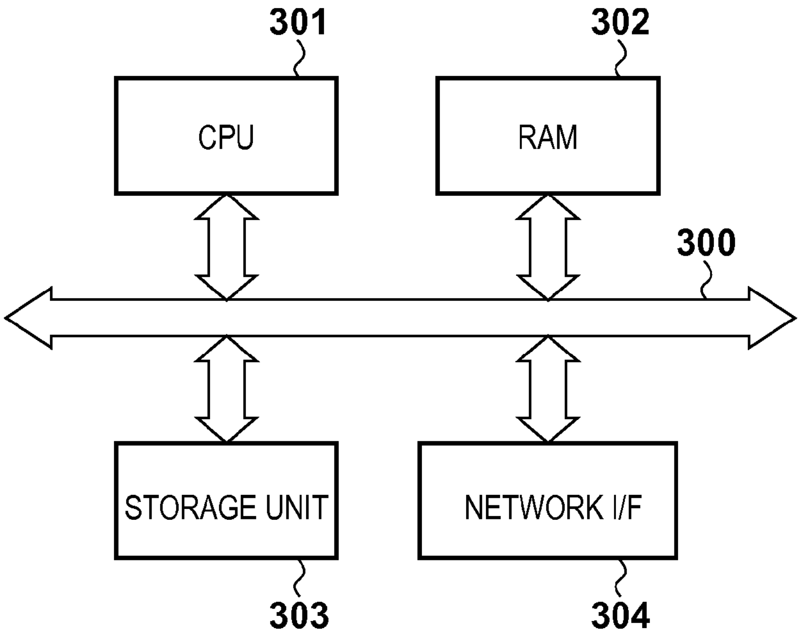
FIG. 3 is a block diagram showing an example of the hardware configuration of a data processing server and a storage server according to the embodiments.

FIG. 3 is a block diagram showing an example of the hardware configuration of the data processing server 102 and the storage server 103 of the embodiments. Note that the data processing server 102 and the storage server 103 are shown here as having a common hardware configuration since they can be configured by a general-purpose PC or the like. Therefore they are shown by the one FIG. 3.

A CPU 301 performs overall control of the data processing server 102 or the storage server 103 in accordance with programs that have been read out from a storage unit 303 and deployed to a RAM 302. The RAM 302 provides an area for the deployment of programs to be executed by the CPU 301, and a work area for the CPU 301. The storage unit 303 stores programs and various settings, and may be an HDD or the like. A network interface (I/F) 304 performs communication with other devices via the network 100. The above units are connected to the CPU 301 via a main bus 300.

Note that unless specified otherwise in the present embodiment, the CPU 301 executes various types of processing by controlling the RAM 302, the storage unit 303, and the network interface 304 via the main bus 300.

Figure 4:
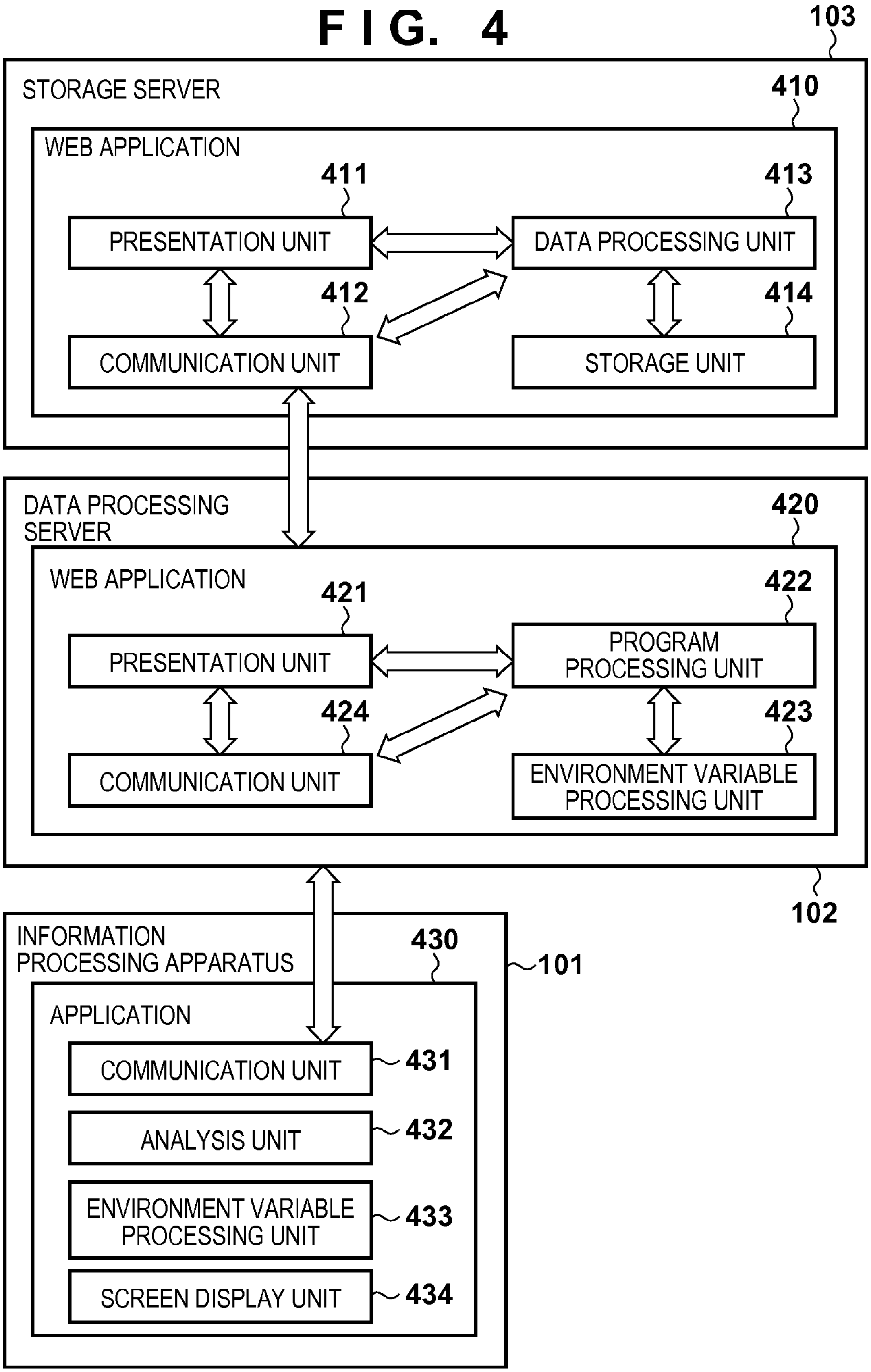
FIG. 4 is a functional block diagram illustrating the overall software configuration of an information processing system according to an embodiment.

FIG. 4 is a functional block diagram illustrating an example of the overall software configuration of the information processing system according to the present embodiment. The functional units shown in FIG. 4 are realized by the CPU 201 and the CPUs 301 of the information processing apparatus 101, the data processing server 102, and the storage server 103 executing control programs.

The information processing apparatus 101 has an application 430. The functions of the application 430 are realized by the CPU 201 of the information processing apparatus 101 executing control programs. Note that although the data processing server 102 and the storage server 103 are web servers that transmit and receive requests and responses in accordance with the SOAP protocol in the present embodiment, the present invention is not limited to this.

The application 430 has a communication unit 431, an analysis unit 432, an environment variable processing unit 433, and a screen display unit 434. The communication unit 431 communicates with a program processing unit 422 of a web application 420 via a communication unit 424 of the data processing server 102 in accordance with the SOAP or HTTP protocol.

More specifically, information that was input via an operation screen displayed on the UI display unit 207 by the screen display unit 434 is transmitted by the communication unit 431 as a request to the web application 420 of the data processing server 102. The communication unit 431 also receives a response transmitted from the web application 420.

The analysis unit 432 analyzes the response received from the web application 420. Described in the response are HTML information, which is a description indicating the content of an operation screen to be displayed by the screen display unit 434, and a processing request for the environment variable processing unit 433. If the result of the analysis performed by the analysis unit 432 is that the response received from the web application 420 includes an environment variable, the environment variable processing unit 433 acquires an environment variable value that is registered in the information processing apparatus 101 and carries out replacement processing. Also, when necessary, a request is transmitted to the web application 420 of the data processing server 102 via the communication unit 431. Note that the processing performed by the environment variable processing unit 433 is used in the processing of the second embodiment. The screen display unit 434 displays an operation screen on the UI display unit 207 based on HTML data in accordance with the analysis result from the analysis unit 432.

The data processing server 102 includes the web application 420. The web application 420 includes a presentation unit 421, the program processing unit 422, the communication unit 424, and an environment variable processing unit 423. The presentation unit 421 provides a screen for editing an environment variable management table used in the information processing system. Based on user access from a web browser via the communication unit 424, the screen for editing the environment variable management table is generated in HTML and displayed on the client web browser. Also, the environment variable processing unit 423 updates the environment variable management table via the program processing unit 422 as necessary in accordance with user input values.

The program processing unit 422 performs processing with respect to input information from the information processing apparatus 101 that was received from the communication unit 424. For example, the environment variable processing unit 423 is requested to perform environment variable replacement processing as necessary based on a job instruction selected by the user. The environment variable processing unit 423 is also instructed to perform processing for updating the environment variable management table based on input from the presentation unit 421.

In response to the processing request from the program processing unit 422, the environment variable processing unit 423 detects an environment variable included in the instruction, and performs replacement processing with respect to that variable. A processing request is also made by performing communication with a data processing unit 413 of the storage server 103 in the network via the communication units 424 and 412 as necessary. Also, the environment variable management table (FIG. 6) is edited based on an instruction from the program processing unit 422. The communication unit 424 is a software module that performs communication using the SOAP or HTTP protocol by controlling the network interface 304.

The storage server 103 has a web application 410. The web application 410 includes a presentation unit 411, the communication unit 412, the data processing unit 413, and a storage unit 414. In accordance with a request from the web browser, the presentation unit 411 transmits HTML information to be display by the browser and a request to the data processing unit 413 via the communication unit 412. The data processing unit 413 interprets the request that was received from the data processing server 102 via the communication unit 412, and registers data in the storage unit 414 as necessary. Besides data, attribution information such as an index is also registered. The data processing unit 413 also interprets the request from the presentation unit 411 and instructs the storage unit 414 to perform a data search, data deletion, or the like. The storage unit 414 carries out data registration, editing, or the like based on the instruction from the data processing unit 413. The communication unit 412 is a software module that performs communication using the SOAP or HTTP protocol by controlling the network interface 304.

FIG. 5 is a flowchart illustrating replacement processing performed by the data processing server 102 according to the present embodiment. The steps in this flow are processed by the CPU 301 of the data processing server 102 executing a program stored in the storage unit 303. Note that before the execution of this flowchart, the user executes a job by selecting a job instruction (FIG. 9) on the UI display unit 207 of the information processing apparatus 101. Data that is to be registered in the storage server 103 is then in the condition of having been sent from the information processing apparatus 101 to the data processing server 102.

FIG. 9 is a diagram showing an example of an instruction that instructs the execution of a job according to the present embodiment.

This job execution instruction is described in the XML format, and is configured by the following four elements necessary for the execution of a job. The first element is the HEADER element, which defines overview content regarding the instruction. In this example in FIG. 9, a ticket ID, the ticket owner, and the fact that the owner is an administrator are described in this element.

The second element is the ScanSetting element, which describes the content of settings related to the information processing apparatus 101 that are to be used when scanning is executed. In FIG. 9, the resolution of 600 dpi and the file format PDF are described in this element.

The third element is the ImageProcesserSetting element, which defines the content of settings regarding image processing that is performed on a scanned image in the data processing server 102.

The fourth element is the CloudSetting element, which defines content regarding the destination storage server 103 to which scan data from the data processing server 102 is to be sent. In an instruction having this format, an environment variable that is used is defined in the value within an element such as "%1:FOLDER %", as indicated by reference sign 901.

Note that the content described in the job execution instruction is not limited to these four elements, and can be changed as appropriate.

The program processing unit 422 of the data processing server 102 analyzes the job instruction that is to be executed (FIG. 9). If the result of this analysis is that an environment variable is included in the instruction (FIG. 9), the program processing unit 422 requests the environment variable processing unit 423 to perform processing. Next is a description of details of the environment variable management table and various items (an environment variable, a check flag, a sorting criterion, and the like) with reference to FIG. 6.

FIG. 6 is a diagram illustrating an example of the environment variable management table that is used when replacing environment variables according to the present embodiment.

In this environment variable management table, one information record is defined as an environment variable definition 607 for each environment variable, and each record has six setting items. The following describes these six setting items.

The first item is an environment variable 600 that defines the name of the environment variable that is to be replaced. The environment variable processing unit 423 of the data processing server 102 compares the environment variable name defined in the instruction (FIG. 9) and the environment variables 600 defined in the environment variable management table, and analyzes the information record in which the environment variables match. Regarding the format of the environment variable, the variable is enclosed between "%" and "%", and the acquisition destination (check flag) for a value when carrying out replacement is defined after the first "%". If the check flag is not designated or "0", a value is acquired from an environment variable that is designated locally (in the data processing server 102). On the other hand, if the check flag is "1", a value is acquired from another system such as the storage server 103.

The second item is a connection destination 601 for registration of the name of the storage server 103 from which a value that is to replace the environment variable is to be acquired. The connection destination is determined based on the name of the storage server 103. Also, depending on the connection destination 601, connection is performed with a different method of connecting to the storage server 103 for each connection destination.

The third item is path information 602 that indicates address information (URL) of the data processing server 102 or the storage server 103 to be used when actually acquiring a value. A value is acquired from the data processing server 102 or the storage server 103 based on this address information. A script for acquiring a value can also be defined in the path information 602. A script is one type of program, and the environment variable processing unit 423 can also acquire a value from an undefined connection destination or the like by directly executing a script. Note that SQL is one example of a script that can be interpreted.

The fourth item is a replacement data type 604 that defines the type of replacement that is to be performed when using an acquired value in replacement. There are two replacement data types, namely "singular type" and "list type". With the singular type, if multiple values are acquired from the data processing server 102 or the storage server 103, the value that is first according to a later-described sorting method 605 and a sorting criterion 606 is acquired and used in replacement. With the list type, acquired values are subjected to processing according to the sorting method 605 and the sorting criterion 606, and replacement processing is carried out using the values as they are (without selecting only one value).

The fifth item is the sorting method 605 that designates a sorting method for acquired data. There are three sorting methods, namely "ascending order", "descending order", and "no setting". In the cases of "ascending order" and "descending order", acquired data is reordered in the designated order, and sorting is not performed in the case of "no setting". The sixth item is the sorting criterion 606 that defines the criterion to be used when performing sorting. There are three sorting criteria, namely "date", "data name", and "data size", and sorting is carried out based on the sorting criterion that has been set. According to these six setting items, environment variables are specified, necessary values are acquired from the data processing server 102 or the storage server 103, the values are processed based on the replacement type and sorting method that are set, and then replacement processing is carried out.

The following describes the flowchart of FIG. 5 based on the above description.

First, in step S501, the CPU 301 searches the environment variables 600 in the environment variable management table (FIG. 6) for the environment variable ("%1:FOLDER %" in FIG. 9) in the instruction (FIG. 9). The CPU 301 then acquires the environment variable definition 607 that corresponds to the matching environment variable. The procedure then moves to step S502, in which the CPU 301 acquires the check flag included in the environment variable 600 from the environment variable definition that was acquired in step S501. If the check flag does not indicate connection to another system (is not designated or is "0"), the procedure moves to step S503, in which the CPU 301 acquires an environment variable held in the data processing server 102 itself, and then this processing ends.

On the other hand, if the check flag indicates connection to another system ("1" in FIG. 6) in step S502, the procedure moves to step S504, in which the CPU 301 checks the connection destination 601 and acquires information on the storage server 103 that is the connection destination. Here, the information of the path information 602 managed in the environment variable management table is acquired. Next, the procedure moves to step S505, in which the CPU 301 determines whether a script is described in the path information 602 that was acquired in step S504. If a script is described, the procedure moves to step S506, in which the CPU 301 executes the described script, and then the procedure moves to step S514. On the other hand, if it is determined in step S505 that a script is not described, the procedure moves to step S507, in which the CPU 301 selects an appropriate library and acquires data that is to be used in replacement from the storage server 103 based on the path information 602, and then the procedure moves to step S508.

In step S508, the CPU 301 determines whether multiple pieces of data were acquired from the storage server 103. If multiple pieces of data were not acquired, the procedure moves to step S514, in which replacement processing is executed based on the data, and then the procedure ends.

On the other hand, if it was determined in step S508 that multiple pieces of data were acquired, the procedure moves to step S509, in which the CPU 301 acquires the replacement data type 604 managed in the environment variable management table (FIG. 6). Then procedure then moves to step S510, in which the sorting method 605 managed in the environment variable management table (FIG. 6) is acquired, and it is determined whether sorting is necessary. If it is determined here that sorting is not necessary, the procedure moves to step S514, in which replacement processing is carried out, and then the procedure ends.

On the other hand, if it was determined in step S510 that sorting is necessary, the procedure moves to step S511, in which the CPU 301 acquires the sorting criterion 606 managed in the environment variable management table (FIG. 6). The procedure then moves to step S512, in which the sorting method 605 managed in the environment variable management table (FIG. 6) is acquired. Thereafter, the CPU 301 executes sorting in step S513 based on the sorting criterion and the sorting method that were acquired in steps S511 and S512. The procedure then moves to step S514, in which replacement processing is carried out based on the value obtained after sorting was last performed, and then the procedure ends.

According to the processing described above, an environment variable defined in an instruction (FIG. 9) is replaced with an appropriate value based on definition information in an environment variable management table (FIG. 6), and the value obtained by this replacement is used in processing for registering data in the storage server 103 or the like, which is later-stage processing.

According the first embodiment described above, a value that is to replace an environment variable defined in an instruction can be acquired from an external server based on the environment variable and the content of an environment variable management table, and processing for replacing the environment variable can be performed. The present embodiment enables resource information in an up-to-date condition in another device to be easily acquired from an application and used.

Second Embodiment

The following describes a second embodiment of the present invention. In the second embodiment, a value to be used in replacement processing can be acquired not only locally (data processing server 102) and from another system (storage server 103), but also from the information processing apparatus 101. The following describes a method of causing the information processing apparatus 101 to execute environment variable replacement processing from the data processing server 102. Note that the hardware configurations of the information processing system, the information processing apparatus 101, the data processing server 102, and the storage server 103 of the second embodiment will not be described since they are similar to those in the first embodiment.

Figure 7:
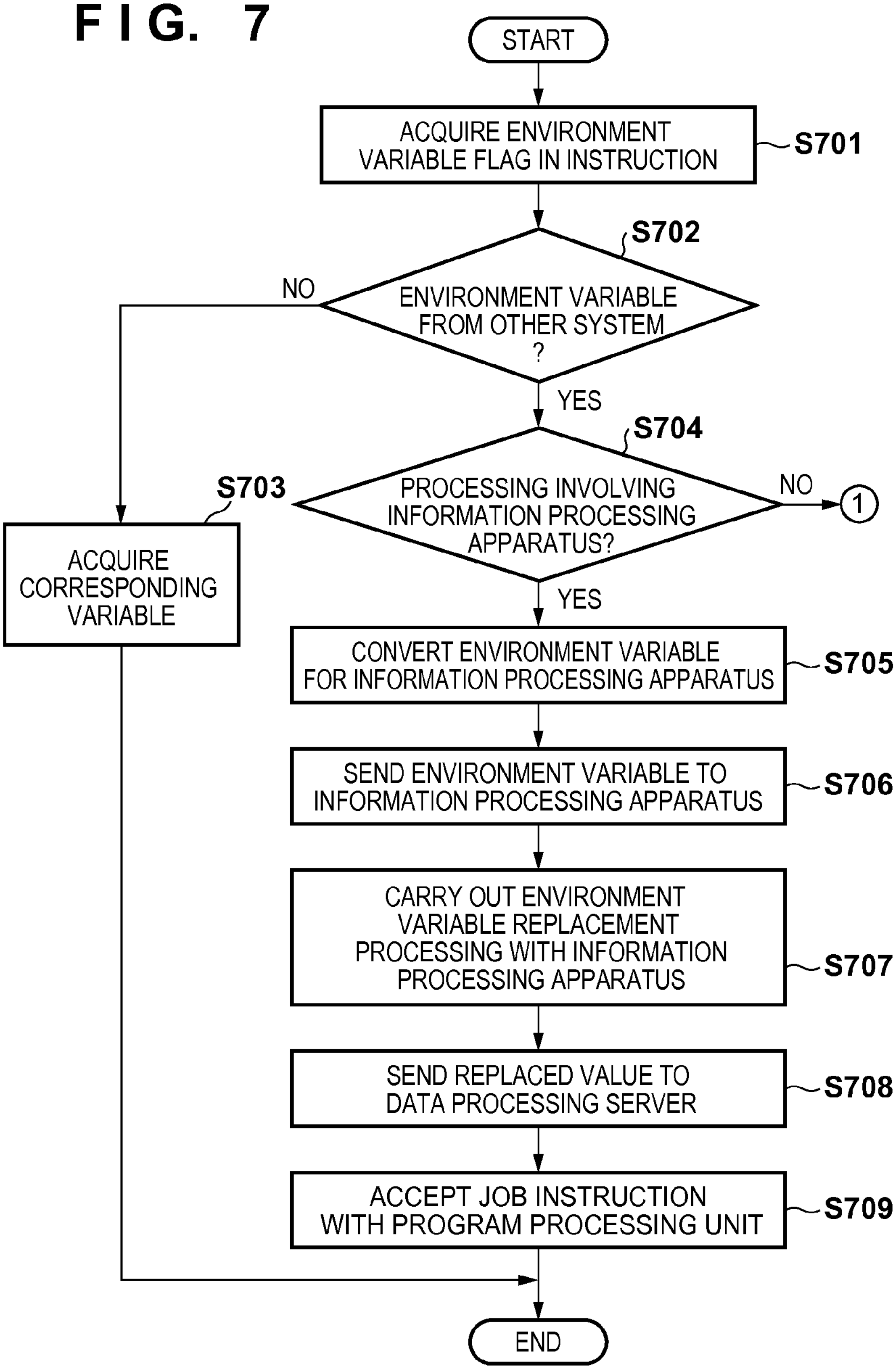
FIG. 7 is a flowchart illustrating environment variable replacement processing according a second embodiment of the present invention.

FIG. 7 is a flowchart illustrating environment variable replacement processing according to the second embodiment of the present invention. The steps in this flow are processed by the CPU 301 of the data processing server 102 or the CPU 201 of the information processing apparatus 101 executing a program stored in the storage unit 303 or the storage unit 205. Note that processing in the case of "No" in step S704 in FIG. 7 will not be described since it is the same as the processing from step S504 onward in FIG. 5.

First, in step S701, the CPU 301 checks the check flag of the environment variable in the job instruction (FIG. 9). Next, in step S702, if the result of the check is that the check flag does not indicate connection to another system (is not designated or is "0"), the procedure moves to step S703, in which a value corresponding to the environment variable is acquired locally (from the data processing server 102), and then the procedure ends.

On the other hand, if the check flag is "1" in step S702, that is to say, if the environment variable is to be acquired from another system, the procedure moves to step S704, in which the CPU 301 determines whether the environment variable is to be acquired from the information processing apparatus 101. In the case of acquiring the environment variable from another system other than the information processing apparatus 101, the processing from step S504 onward in FIG. 5 is performed.

If it is determined in step S704 that a value is to be acquired from the information processing apparatus 101, the procedure moves to step S705, in which the CPU 301 converts the environment variable so as to be able to be interpreted by the information processing apparatus 101. For example, if the environment variable is "%2:SID %", the check flag "2:" is deleted to obtain "% SID %". The procedure then moves to step S706, in which the value of the corresponding place in the job instruction (FIG. 9) is replaced with this converted value, and the resulting job instruction is sent to the information processing apparatus 101.

The procedure then moves to step S707, in which the CPU 201 of the information processing apparatus 101 replaces the environment variable in the job instruction that was sent from the data processing server 102 with a value saved in the information processing apparatus 101. The procedure then moves to step S708, in which the CPU 201 sends, to the data processing server 102, the job instruction resulting from the replacement performed by the information processing apparatus 101. Then in step S709, the data processing server 102 accepts the instruction (FIG. 9) that was sent from the information processing apparatus 101 and continues to perform processing.

FIG. 8 is a diagram showing an example of an environment variable management table that is used when replacing environment variables according to the second embodiment. The following describes differences from the environment variable management table in FIG. 6.

An environment variable 800 defines the name of the environment variable that is to be replaced. A difference from the environment variable 600 in FIG. 6 is that "2" can be designated as the check flag. This enables the information processing apparatus 101 to be designated as the location from which the value to be used in replacement is to be acquired. This designation makes it possible to replace an environment variable that can be interpreted by the environment variable processing unit 433 of the information processing apparatus 101.

According the second embodiment, it is possible to use an environment variable defined in the information processing apparatus 101, thus making it possible to realize access to the storage server 103 using that value, thus improving user convenience in the execution of a job using a job instruction.

Note that although the data processing server 102 includes the environment variable processing unit 423 in the first and second embodiments described above, the environment variable management table (FIG. 6 and FIG. 8) used by the environment variable processing unit 423 may be stored in the environment variable processing unit 433 of the information processing apparatus 101.

Managing the environment variable management table of the environment variable processing unit 433 in the information processing apparatus 101 eliminates the need for processing in the data processing server 102. Also, it is possible to realize an improvement in performance by enabling the information processing apparatus 101 to directly connect to the storage server 103.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-229177, filed Oct. 18, 2011, which is hereby incorporated by reference herein in its entirety.

What is claimed is:

1. An information processing system in which at least an information processing apparatus, a data processing server, and a storage server are connected via a network, the information processing system comprising:

a processor; and a memory storing instructions that, when executed by the processor, causes the processor to function as:

an acquisition unit configured to, based on a job execution instruction from the information processing apparatus, acquire an environment variable that is instructed in the job execution instruction;

a search unit configured to search, in an environment variable management table, for an environment variable definition that corresponds to the environment variable acquired by the acquisition unit;

a selection unit configured to, based on an environment variable definition searched by the search unit, select an apparatus that is in the network and holds a value that is to replace the environment variable; and a replacement unit configured to acquire the value that is to replace the environment variable from the apparatus selected by the selection unit, and replace the environment variable with the value, wherein the environment variable definition includes information that indicates a sorting method to be used when a plurality of values that are to replace the environment variable exist, and indicates a criterion to be used when sorting is performed.

2. The information processing system according to claim 1, wherein the environment variable definition includes information that specifies the apparatus that holds the value that is to replace the environment variable.

3. The information processing system according to claim 2, wherein the information is a script.

4. The information processing system according to claim 2, wherein the information indicates a path.

5. A data processing apparatus connected to a network, comprising:

a processor; and a memory storing instructions that, when executed by the processor, causes the processor to function as:

an acquisition unit configured to, based on a job execution instruction from a device that is connected to the network, acquire an environment variable that is instructed in the job execution instruction;

a search unit configured to search, in an environment variable management table, for an environment variable definition that corresponds to the environment variable acquired by the acquisition unit;

a selection unit configured to, based on an environment variable definition searched by the search unit, select a device that is in the network and holds a value that is to replace the environment variable; and a replacement unit configured to acquire the value that is to replace the environment variable from the device selected by the selection unit, and replace the environment variable with the value, wherein the environment variable definition includes information that indicates a sorting method to be used when a plurality of values that are to replace the environment variable exist, and indicates a criterion to be used when sorting is performed.

6. The data processing apparatus according to claim 5, wherein the environment variable definition includes information that specifies the device that holds the value that is to replace the environment variable.

7. The data processing apparatus according to claim 6, wherein the information is a script.

8. The data processing apparatus according to claim 6, wherein the information indicates a path.

9. A control method for controlling an information processing system in which at least an information processing apparatus, a data processing server, and a storage server are connected via a network, the control method comprising:

acquiring, based on a job execution instruction from the information processing apparatus, an environment variable that is instructed in the job execution instruction;

searching, in an environment variable management table, for an environment variable definition that corresponds to the acquired environment variable;

selecting, based on a searched environment variable definition, an apparatus that is in the network and holds a value that is to replace the environment variable; and acquiring the value that is to replace the environment variable from the selected apparatus, and replacing the environment variable with the value, wherein the environment variable definition includes information that indicates a sorting method to be used when a plurality of values that are to replace the environment variable exist, and indicates a criterion to be used when sorting is performed.

10. A control method for controlling a data processing apparatus connected to a network, comprising:

acquiring, based on a job execution instruction from a device that is connected to the network, an environment variable that is instructed in the job execution instruction;

searching, in an environment variable management table, for an environment variable definition that corresponds to the acquired environment variable;

selecting, based on a searched environment variable definition, a device that is in the network and holds a value that is to replace the environment variable; and acquiring the value that is to replace the environment variable from the selected device, and replacing the environment variable with the value, wherein the environment variable definition includes information that indicates a sorting method to be used when a plurality of values that are to replace the environment variable exist, and indicates a criterion to be used when sorting is performed.

11. A non-transitory computer-readable storage medium storing a program for controlling a data processing apparatus connected to a network, the program, when executed by a computer causes the computer to perform:

acquiring, based on a job execution instruction from a device that is connected to the network, an environment variable that is instructed in the job execution instruction;

searching, in an environment variable management table, for an environment variable definition that corresponds to the acquired environment variable;

selecting, based on a searched environment variable definition, a device that is in the network and holds a value that is to replace the environment variable; and acquiring the value that is to replace the environment variable from the selected device, and replacing the environment variable with the value, wherein the environment variable definition includes information that indicates a sorting method to be used when a plurality of values that are to replace the environment variable exist, and indicates a criterion to be used when sorting is performed.

* * * * *